(12) United States Patent
Beyer (10) Patent No.: US 10,228,036 B2
(45) Date of Patent: Mar. 12, 2019

(54) IMPACT DIFFUSING APPARATUS (71) Applicant: Albert A. Beyer, Edmonton (CA)

(72) Inventor: Albert A. Beyer, Edmonton (CA)

( * ) Notice: Subject to any disclaimer, the term of this patent is extended or adjusted under 35 U.S.C. 154(b) by 401 days.

(21) Appl. No.: 15/060,284

(22) Filed: Mar. 3, 2016

(65) Prior Publication Data
US 2016/0258503 A1 Sep. 8, 2016

Related U.S. Application Data (60) Provisional application No. 62/127,357, filed on Mar. 3, 2015.

(51) Int. Cl.
A42B 3/12 (2006.01)
F16F 7/00 (2006.01)
F16F 7/12 (2006.01)

(52) U.S. Cl.
CPC .............. *F16F 7/003* (2013.01); *A42B 3/121* (2013.01); *A42B 3/124* (2013.01); *A42B 3/127* (2013.01); *F16F 7/124* (2013.01); *F16F 2224/0241* (2013.01); *F16F 2230/0023* (2013.01); *F16F 2236/04* (2013.01)

(58) Field of Classification Search
CPC .. A42B 3/00; A42B 3/06; A42B 3/122; A42B 3/121; A63B 71/10; A41D 13/015
See application file for complete search history.

(56) References Cited

U.S. PATENT DOCUMENTS

| | | | | |
|---|---|---|---|---|
| 2,759,186 A | * | 8/1956 | Dye | ........................ A42B 3/121 2/413 |
| 3,174,155 A | | 3/1965 | Pitman | |
| 4,375,108 A | * | 3/1983 | Gooding | ................ A42B 3/121 2/413 |
| 5,263,203 A | * | 11/1993 | Kraemer | ................ A42B 3/122 2/413 |
| 5,815,846 A | * | 10/1998 | Calonge | ................ A42B 3/121 2/413 |

(Continued)

FOREIGN PATENT DOCUMENTS

| | | |
|---|---|---|
| KR | 10-0725345 B1 | 5/2007 |
| WO | 02/32245 A1 | 4/2002 |

OTHER PUBLICATIONS

Consumer Product Safety Commission, "Safety Standard for Bicycle Helmets: Final Rule (16 CFR Part 1203)," Federal Register 63(46):11711-11747, Mar. 10, 1998.

(Continued)

*Primary Examiner* — Tajash D Patel
(74) *Attorney, Agent, or Firm* — Christensen O'Connor Johnson Kindness, PLLC (57) ABSTRACT

There is provided an impact diffusing apparatus for diffusing force on an object being impacted, the apparatus having a body intersected by a plane having a first side and a second side opposite the first side. The body has a first collapsible structure on the first side of the plane and a second collapsible structure on the second side of the plane, each collapsible structure having an interior surface and an exterior surface. The interior surfaces of the collapsible structures are shaped to define an interior cavity. The apparatus has air passages communicating between the interior cavity of the collapsible surfaces and an external environment, as well as a mounting structure for mounting the body to the object.

38 Claims, 4 Drawing Sheets

(56) References Cited

U.S. PATENT DOCUMENTS

| | | | |
|---|---|---|---|
| 6,272,692 B1 | 8/2001 | Abraham | |
| 6,314,586 B1 | 11/2001 | Duguid | |
| 7,673,351 B2* | 3/2010 | Copeland | A41D 31/005 2/425 |
| 7,774,866 B2* | 8/2010 | Ferrara | A42B 3/121 2/455 |
| 7,895,681 B2* | 3/2011 | Ferrara | B29C 45/0053 2/455 |
| 8,776,272 B1 | 7/2014 | Straus et al. | |
| 9,439,468 B1* | 9/2016 | Blagg | A42B 3/105 |
| 2010/0186151 A1 | 7/2010 | O'Leary | |
| 2012/0297525 A1 | 11/2012 | Bain | |
| 2013/0031700 A1 | 2/2013 | Wacter et al. | |
| 2013/0283503 A1 | 10/2013 | Zilverberg | |
| 2014/0097052 A1* | 4/2014 | Reynolds | F16F 1/376 188/377 |
| 2014/0101828 A1 | 4/2014 | Sugerman et al. | |

OTHER PUBLICATIONS

Nakaguchi, H., and K. Tsutsumi, "Mechanisms of Snowboarding-Related Severe Head Injury: Shear Strain Induced by the Opposite-Edge Phenomenon," Journal of Neurosurgery 97(3):542-548, Sep. 2002.

Brainard, L.L., et al., "Gender Differences in Head Impacts Sustained by Collegiate Ice Hockey Players," Medicine and Science in Sports and Exercise 44(2):297-304, Feb. 2012. (Author Manuscript provided, PMCID: PMC3694342, available in PMC Jun. 27, 2013, 16 pages).

Gwin, J.T., et al., "In situ Measures of Head Impact Acceleration in NCAA Division I Men's Ice Hockey: Implications for ASTM F1045 and Other Ice Hockey Helmet Standards," Journal of ASTM International 6(6)1-10,2009.

Mertz, H.J., et al., "Biomechanical and Scaling Bases for Frontal and Side Impact Injury Assessment Reference Values," Stapp Car Crash Journal 47:155-188, Oct. 2003.

Dennison, C.R., et al., "An In-Fiber Bragg Grating Sensor for Contact Force and Stress Measurements in Articular Joints," Measurement Science and Technology 21(11):115803, Nov. 2010, 15 pages.

Dennison, C.R., et al., "Mechanisms of Cervical Spine Injury in Rugby Union: Is It Premature to Abandon Hyperflexion as the Main Mechanism Underpinning Injury?" British Journal of Sports Medicine 46(8):545-549, Jun. 2012.

Cripton, P.A., et al., "Bicycle Helmets Are Highly Effective at Preventing Head Injury During Head Impact: Head-Form Accelerations and Injury Criteria for Helmeted and Unhelmeted Impacts," Accident Analysis and Prevention 70:1-7, Sep. 2014.

Daneshvar, D.H., et al., "The Epidemiology of Sport Related Concussion," Clinics in Sports Medicine 30(1):1-17, Jan. 2011.

Zhang, L., et al., "A Proposed Injury Threshold for Mild Traumatic Brain Injury," Journal of Biomechanical Engineering 126(2):226-236, Apr. 2004.

\* cited by examiner

IMPACT DIFFUSING APPARATUS

TECHNICAL FIELD

This relates to an impact diffusing apparatus for attachment to an impact receiving object, such as a helmet.

BACKGROUND

Although the exact cause of concussions is not known, it is assumed that the force and duration of impact is an indication in their occurrence, and standardized testing looks at the amount of force reduction, and the increase in duration when testing a helmet's performance. When engaging in activities where impact forces to the head are likely, it is commonly required that helmets be used for additional protection. However, depending on the type of impact, helmets may be insufficient to diffuse the force and prevent damage, such as concussions. This is especially true where a user is unable to react to a force, such as when falling directly backwards, as the back of the head is impossible to protect during a fall with the arms.

SUMMARY

According to an aspect, there is provided an impact diffusing apparatus for diffusing force on an object being impacted, the apparatus comprising a body intersected by a plane having a first side and a second side opposite the first side, the body comprising a first collapsible structure on the first side of the plane and a second collapsible structure on the second side of the plane, each collapsible structure comprising an interior surface and an exterior surface, wherein the interior surfaces of the collapsible structures are shaped to define an interior cavity, and air passages communicating between the interior cavity of the collapsible surfaces and an external environment, and a mounting structure for mounting the body to the object.

According to another aspect, the collapsible structures may be constructed from composite materials comprising at least one type of fiber and at least one resin.

According to another aspect, the at least one type of fiber may be carbon fiber, fiber glass, aramid, felt in a non-woven mulch form or combinations thereof, and the at least one resin is epoxy, polyester, polyurethane or combinations thereof.

According to another aspect, each collapsible structure may comprise a semi-hemispherical shape.

According to another aspect, each collapsible structure may be angled outward relative to the interior cavity at the plane.

According to another aspect, each collapsible structure may comprise a hemispherical shape.

According to another aspect, the mounting structure may comprise a rigid mounting plate attached to an apex of the first collapsible structure.

According to another aspect, the mounting structure may comprise a foam retainer attached to the object and may define a cavity that receives and retains the body.

According to another aspect, the body may further comprise a mesh layer that separates the first and second collapsible structures, the mesh layer forming the air passages.

According to another aspect, at least one of the first and second collapsible structures may be textured to induce collapsing at specific locations.

According to another aspect, the impact diffusing apparatus may further comprise an indicator for indicating the collapse of one or more of the first and second collapsible structures.

According to an aspect, there is provided the combination of a helmet comprising a rigid exterior layer, an impact diffusing apparatus comprising a body intersected by a plane having a first side and a second side opposite the first side, the body comprising a first collapsible structure on a first side of the plane and a second collapsible structure on a second side of the plane, each collapsible structure comprising an interior surface and an exterior surface, wherein the interior surfaces of the collapsible structures are shaped to define an interior cavity, and air passages communicating between the interior cavity of the collapsible surfaces and an external environment, and a mounting structure for mounting the body to the object.

According to another aspect, the collapsible structures may be constructed from composite materials comprising at least one type of fiber and at least one resin.

According to another aspect, the at least one type of fiber may be carbon fiber, fiberglass, aramid, felt in a non-woven mulch form or combinations thereof, and the at least one resin is epoxy, polyester, polyurethane or combinations thereof.

According to another aspect, each collapsible structure may comprise a semi-hemispherical shape.

According to another aspect, each collapsible structure may be angled outward relative to the interior cavity at the plane.

According to another aspect, each collapsible structure may comprise a hemispherical shape.

According to another aspect, the mounting structure may comprise a rigid mounting plate attached to an apex of the first collapsible structure.

According to another aspect, the mounting structure may comprise a foam retainer attached to the object and may define a cavity that receives and retains the body.

According to another aspect, the body may further comprise a mesh layer that separates the first and second collapsible structures, the mesh layer forming the air passages.

According to another aspect, at least one of the first and second collapsible structures may be textured to induce collapsing at specific locations.

According to another aspect, the holder and the impact diffusing apparatus may be affixed to a back side of the helmet.

According to another aspect, the helmet may be a hockey helmet.

According to another aspect, the impact diffusing apparatus further comprises an indicator for indicating the collapse of one or more of the first and second collapsible structures.

According to an aspect, there is provided a method of protecting a helmet from impact, wherein the method comprises attaching an impact diffusing apparatus to contact point of a helmet, the impact diffusing apparatus collapsing upon application of a predetermined force at the contact point, the impact diffusing apparatus comprising a body intersected by a plane having a first side and a second side opposite the first side, the body comprising a first collapsible structure on the first side of the plane and a second collapsible structure on the second side of the plane, each collapsible structure comprising an interior surface and an exterior surface, wherein the interior surfaces of the collapsible structures are shaped to define an interior cavity, and air passages communicating between the interior cavity of the collapsible surfaces and an external environment, and a mounting structure for mounting the body to the object.

According to another aspect the collapsible structures may be constructed from woven composite fibres.

According to another aspect, the woven composite fibres may be one of carbon fibre and fibre glass.

According to another aspect, the collapsible structures may be constructed from one of carbon fibre, fibre glass, felt in a non-woven mulch form, and a combination of carbon fibre and felt in a non-woven mulch form.

According to another aspect, each collapsible structure may comprise a semi-hemispherical shape.

According to another aspect, each collapsible structure may be angled outward relative to the interior cavity at the plane.

According to another aspect, each collapsible structure may comprise a hemispherical shape.

According to another aspect, the mounting structure may comprise a rigid mounting plate attached to an apex of the first collapsible structure.

According to another aspect, the mounting structure may comprise a foam retainer attached to the object and may define a cavity that receives and retains the body.

According to another aspect, the body may further comprise a mesh layer that separates the first and second collapsible structures, the mesh layer forming the air passages.

According to another aspect, at least one of the first and second collapsible structures may be textured to induce collapsing at specific locations.

According to another aspect, the holder and the impact diffusing apparatus may be affixed to a back side of the helmet.

According to another aspect, the helmet may be a hockey helmet.

According to an aspect, there is provided an impact diffusing apparatus for diffusing force on an object being impacted, the apparatus comprising a first collapsible structure and a second collapsible structure, each collapsible structure having a closed end and an open end, the open end of the first collapsible structure being attached to the open end of the second collapsible structure to define an interior cavity, air passages communicating between the interior cavity of the collapsible surfaces and an external environment, and a mounting structure for mounting the body to the object.

According to another aspect, the collapsible structures may be constructed from composite materials comprising at least one type of fiber and at least one resin.

According to another aspect, the at least one type of fiber is carbon fiber, fiberglass, aramid, felt in a non-woven mulch form, and combinations thereof, and the at least one resin is epoxy, polyester, polyurethane, and combinations thereof.

According to another aspect, each collapsible structure may comprise a semi-hemispherical shape.

According to another aspect, each collapsible structure may be angled outward relative to the interior cavity at the plane.

According to another aspect, each collapsible structure may comprise a hemispherical shape.

According to another aspect, the mounting structure may comprise a rigid mounting plate attached to an apex of the first collapsible structure.

According to another aspect, the mounting structure may comprise a foam retainer attached to the object and may define a cavity that receives and retains the body.

According to another aspect, the body may further comprise a mesh layer that separates the first and second collapsible structures, the mesh layer forming the air passages.

According to another aspect, at least one of the first and second collapsible structures may be textured to induce collapsing at specific locations.

According to another aspect, the impact diffusing apparatus may further comprise an indicator for indicating the collapse of one or more of the first and second collapsible structures.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

An impact diffusing apparatus, generally identified by reference numeral 10, will now be described with reference to FIGS. 1-7.

Figure 6:
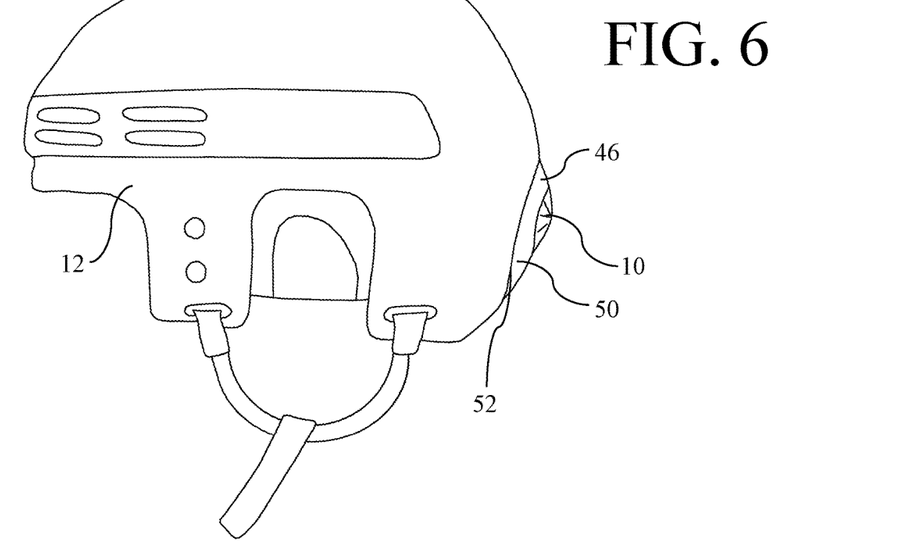
FIG. 6 is a side elevation view of a helmet with an attached impact diffusing apparatus.
Figure 7:
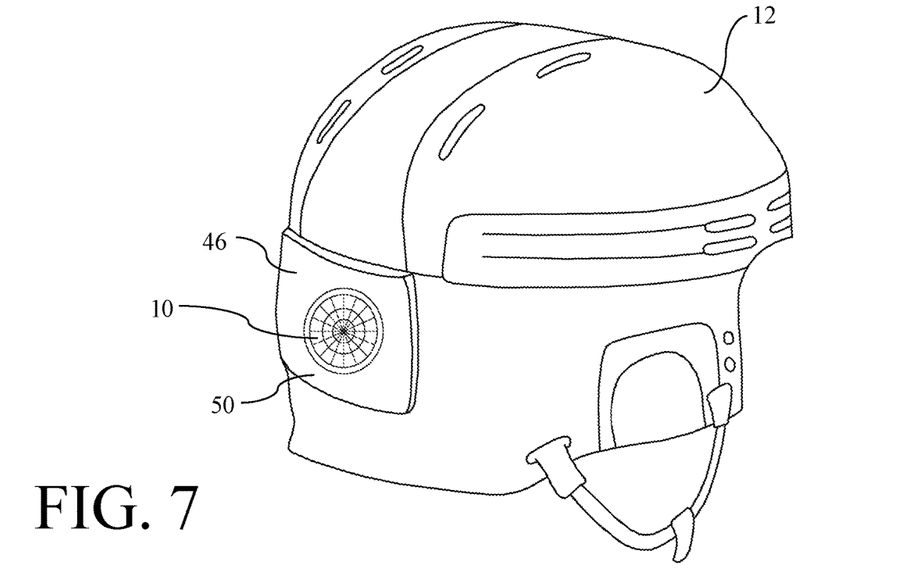
FIG. 7 is a perspective view of the helmet of FIG. 6.

Impact diffusing apparatus 10 is designed to diffuse the force on an object being impacted, such as a sports helmet 12 as shown in FIGS. 6 and 7, although it will be understood that impact diffusing apparatus 10 may also be used on other types of protective equipment, such as elbow pads or knee pads, as will be understood by one skilled in the art. The object to be impacted may also be an intermediate structure positioned between an object to be protected, such as a helmet 12 or a head, and the impact surface. Impact diffusing apparatus 10 will be described below in the context of a hard-shell helmet 12, however, it will be understood that similar principles will also apply to these other types of protective equipment. In one example, impact diffusing apparatus 10 may be mounted to any type of hard-shell helmet 12, such as a hockey or snowboard helmet, with impact diffusing apparatus 10 located at the exterior back. However, it will be understood that impact diffusing apparatus 10 may be located in other locations depending on the sport, the needs of the user, and the sensitivity of particular impacts on the user. Impact diffusing apparatus 10 may be mounted directly to a helmet 12, or may be suspended around helmet 12 using an intermediate structure. Impact diffusing apparatus 10 may be suspended, for example, from shoulder pads or neck bracing devices. During impact, a suspended impact diffusing apparatus 10 may be sandwiched between helmet 12 and the impact surface. Impact diffusing apparatus 10 is preferably easy to access when mounted so that it can be easily replaced after an impact occurs. For example, it may be removably mounted to helmet 12, either coupled to a removable mounting or structure that secures it in place, or removable from the mounting or structure.

Figure 1:
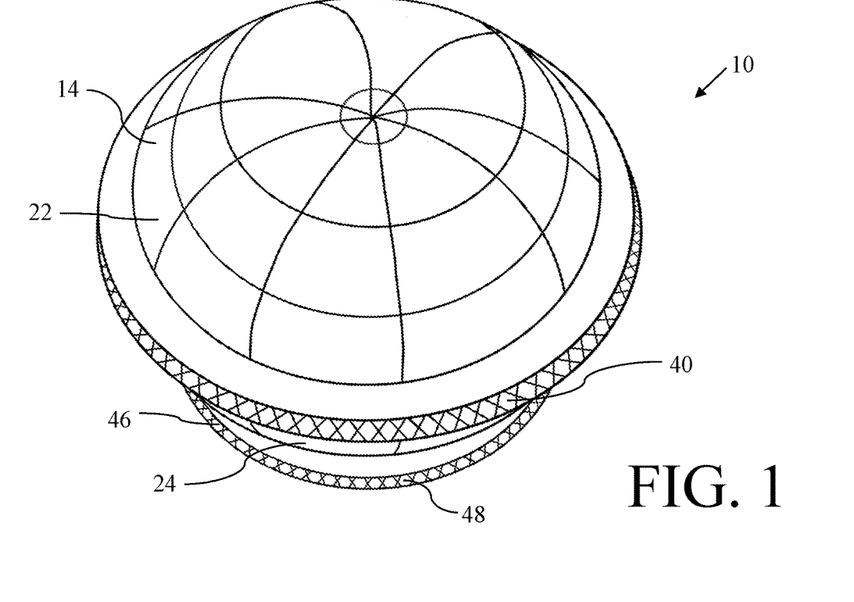
FIG. 1 is an perspective view of an impact diffusing apparatus.
Figure 2:
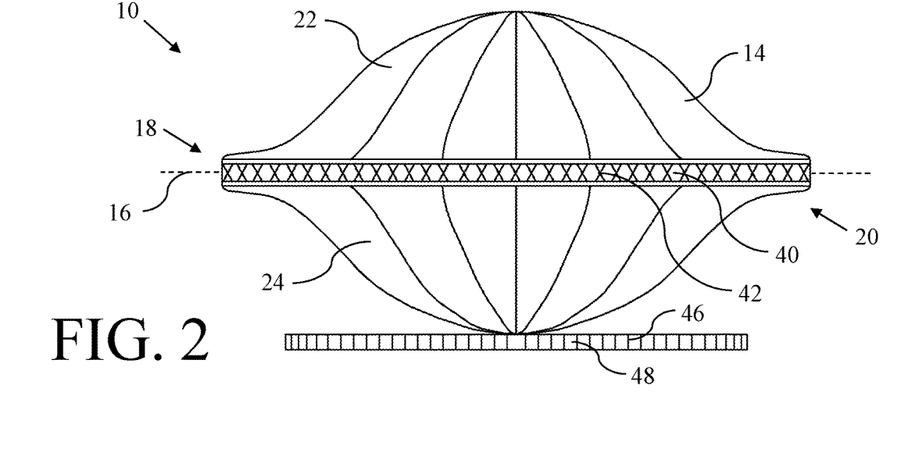
FIG. 2 is a side elevation view of the impact diffusing apparatus of FIG. 1.
Figure 3:
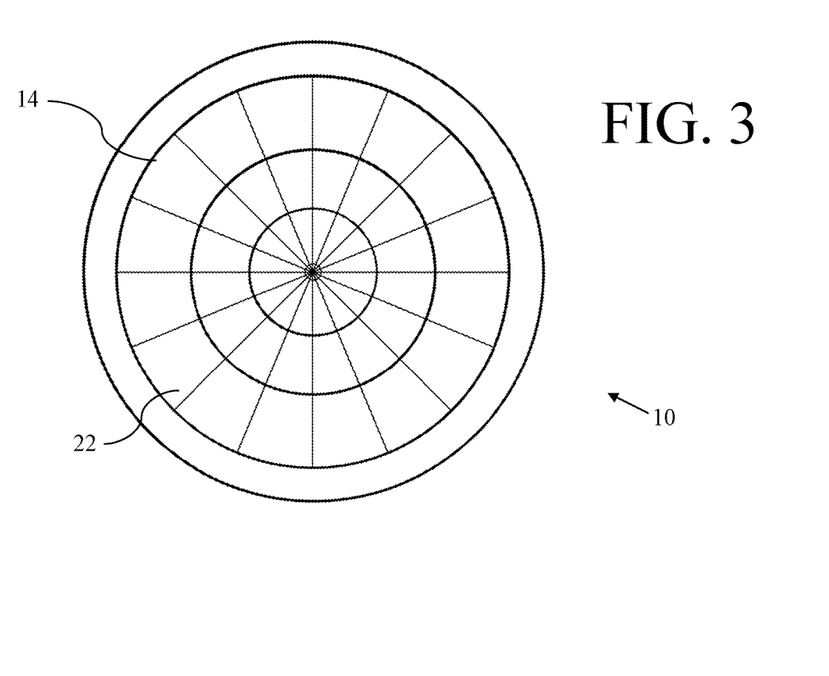
FIG. 3 is a top plan view of the impact diffusing apparatus of FIG. 1.
Figure 4:
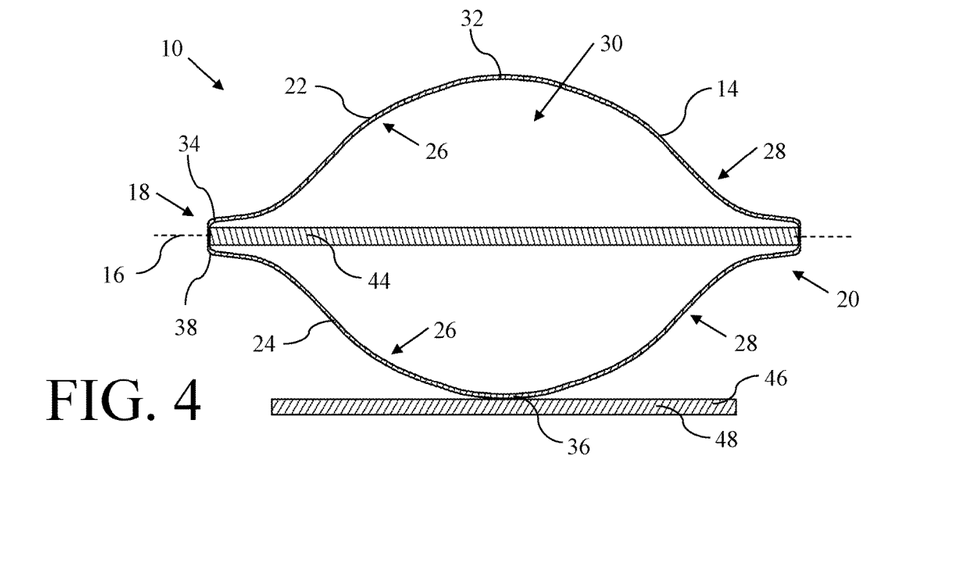
FIG. 4 is a cross-sectional side elevation view of the impact diffusing apparatus of FIG. 1.

Referring to FIG. 1, impact diffusing apparatus 10 has a body 14 that is intersected by a plane 16 (shown in FIG. 2) having a first side 18 and a second side 20 opposite first side 18. On first side 18 of plane 16 there is a first collapsible structure 22, and on second side 20 of plane 16 there is a second collapsible structure 24. The collapsible structures 22 and 24 may be constructed from woven composite fibres, such as carbon fibre or fibre glass, although it will be understood by those skilled in the art that other materials may be used depending on the intended application of impact diffusing apparatus 10. Collapsible structures 22 and 24 may also be constructed from non-woven materials, such as non-woven composite fibres including carbon fibre and fibreglass, felt in a mulched form, or a combination of carbon fibre and felt in a mulch form. Collapsible structures 22 and 24 may also be constructed from any combination of woven and non-woven materials. Referring to FIG. 4, each collapsible structure 22 and 24 has an interior surface 26 and an exterior surface 28, where interior surfaces 26 of collapsible structures 22 and 24 are shaped to define an interior cavity 30. Collapsible structures 22 and 24 have a closed end 32, 36 and an open end 34, 38, open end 34 of first collapsible structure 22 being attached to open end 38 of second collapsible structure 24 to define interior cavity 30. The two collapsible structures 22 and 24 may be bonded together, or they may be formed as a whole.

Preferably, collapsible structures 22 and 24 have a semi-hemispherical shape, where a semi-hemisphere is less than a full hemisphere. In the embodiment shown in FIGS. 1 and 2, this semi-hemispherical shape is truncated prior to where the sides would become vertical in a sphere, such that each collapsible structure 22 and 24 is angled outward relative to interior cavity 30 at plane 16. This shape may be similar to the top portion of a capital omega, and is less than one hemisphere in shape. It will be understood that other shapes may be used. The collapsible structures 22 and 24 may be any two mirror image halves, and may have a shape that varies between forming a round structure with each half forming one hemisphere to a nearly flat shape having a large radius of curvature and a small portion of a hemisphere present. One of the possible criteria to determine a suitable shape, depending on where impact diffusing apparatus 10 is to be used, is to select a shape where a force encountering the top of impact diffusing apparatus 10 will be redirected outwards, away from helmet 12, and therefore directing energy away from the head. Preferably, the forces are redirected perpendicular to the direction of the impact, and collapsible structures 22 and 24 break against each other as the forces are redirected outwards.

Figure 5:
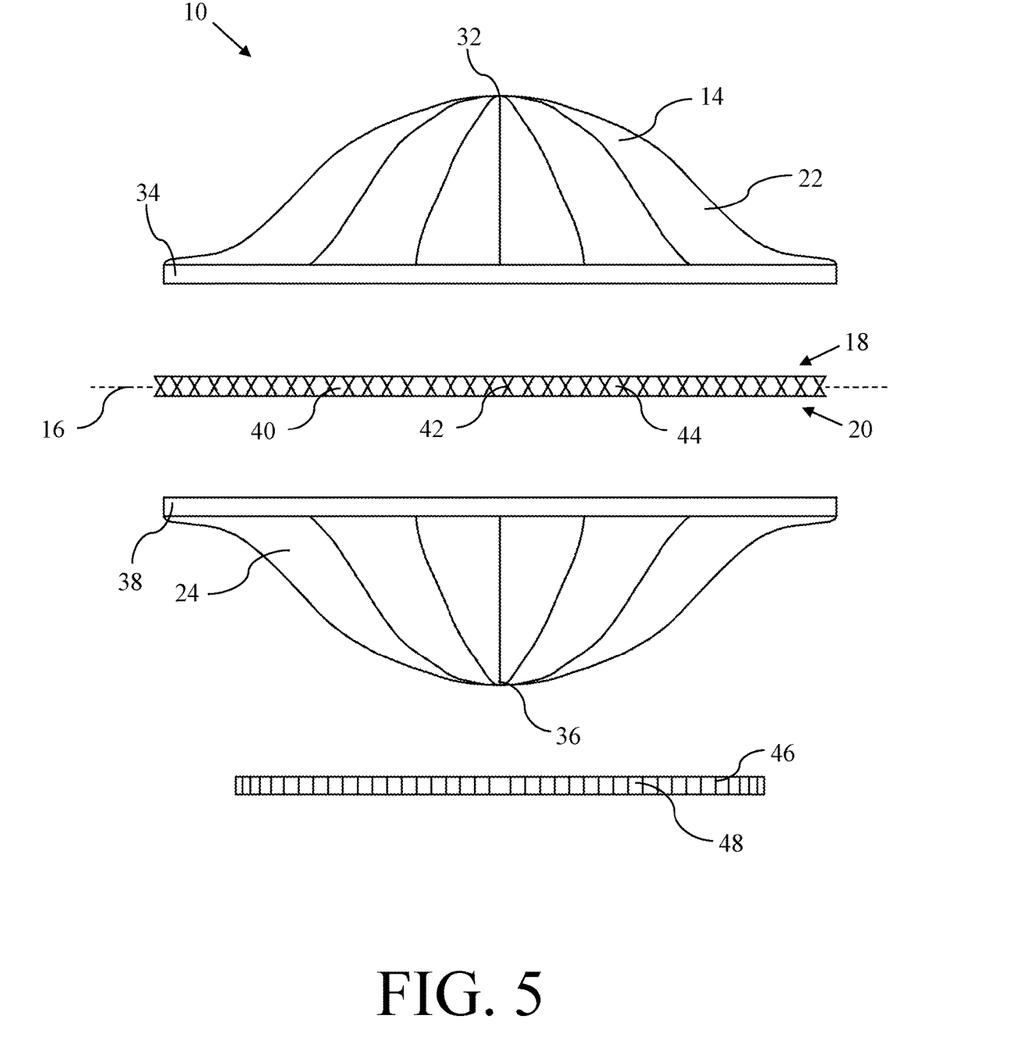
FIG. 5 is an exploded view of the impact diffusing apparatus of FIG. 1.

Referring to FIG. 5, air passages 40 are preferably provided that communicate between interior cavity 30 of collapsible structures 22 and 24 and an external environment. This may be done by providing a mesh layer 42 between first and second collapsible structures 22 and 24, which acts to separate collapsible structures 22 and 24 and form air passages 40 between collapsible structures 22 and 24. By providing an air gap 44 with air passages 40 between collapsible structures 22 and 24, air is allowed to escape as collapsible structures 22 and 24 collapse, and the air is not compressed within the structure 14, which may cause a reduction in the ability to diffuse an impact forces. Air gap 44 is preferably sized such that the air is able to diffuse and escape quickly from impact diffusing apparatus 10.

In order to diffuse the impact force, the collapsible structures may be textured to induce collapsing at specific locations or in specific patterns. Break points or other means of controlling the collapse of the structures may be provided as known in the art. In order to provide rapid diffusion of the impact energy, the collapsible structures may be designed to break or plastically deform when an impact level of concern is reached. The textured surface, the modulus of elasticity of the material, as well as the dimensions can be tailored to break under different impact levels depending on the application. The collapsible structures are preferably designed to reduce the force of impact, and also increase the duration of the impact. In one example, the force was reduced by about 70%, and the duration was increased by about 100%.

Referring to FIGS. 4 and 5, impact diffusing apparatus 10 is preferably designed with a mounting to make it easier to mount to the body of the object, or suspended around the body of the object, by a mounting structure 46. Mounting structure 46 is preferably designed to prevent impact diffusing apparatus 10 from moving when an impact occurs. The object to be impacted may also be an intermediate structure between an object to be protected and the impact surface, in which case mounting structure 46 may also be designed to position impact diffusing apparatus 10 and to direct force toward impact diffusing apparatus 10. This mounting structure 46 may also be used to protect helmet 12 from damage, such as scratching when impact diffusing apparatus 10 collapses. For example, mounting structure 46 may have a rigid mounting plate 48 attached to an apex of the first collapsible structure. This rigid mounting plate 48 may be formed from an aramid such as Kevlar™. Depending on the application, mounting structure 46 may also have a foam retainer 50 that is attached to the object and defines a cavity that receives and retains body 14, as shown in FIG. 7. This retainer 50 may also be formed from moulded silicone, urethane foam, plastic, semi-rigid composites, or other suitable material, and may have layers above or below impact diffusing apparatus 10 to protect helmet 12 or increase the ability of mounting structure 46 to retain impact diffusing apparatus 10. Mounting structure 46 may be integrated with helmet 12, permanently attached to helmet 12, or removably attached. For example, mounting structure 46 may be attached with adhesives, or with bonding techniques such as Velcro™. Impact diffusing apparatus 10 may have an indicator that indicates when the device 14 has been compromised. For example, impact diffusing apparatus 10 may have a visual indicator such as a dye that is released when the impact received by impact diffusing apparatus 10 is too high, or a sensor that sends an indication to a secondary device, or an auditory signal. Other types of impact sensors and indicators may also be used, as will be understood by one skilled in the art.

Operation

Referring to FIGS. 6 and 7, in use, impact diffusing apparatus 10 is preferably used in combination with a helmet 12 having a rigid exterior layer, such as a hockey helmet or a snowboard helmet. Helmet 12 is protected from an impact by attaching an impact diffusing apparatus 10 to a contact point 52 of helmet 12. The contact point as shown is the back of helmet 12, however, it will be understood that other contact points, such as the side of helmet 12 or the front of helmet 12, may be selected depending on the application. Impact diffusing apparatus 10 collapses upon application of a predetermined force at the contact point, deflecting the energy of the application of force outward and away from the head and helmet 12. It will be understood that multiple impact diffusing apparatuses 10 may be attached to a variety of contact points on helmet 12.

Experimental Results

Testing was performed on a prototype of one embodiment of impact diffusing apparatus 10. Drop tests onto a steel anvil were conducted, comparing posterior impacts on helmets with and without the impact diffusing apparatus 10 attached. It was found that impacts at 4.8 m/s exhibited 70% lower peak accelerations with the impact diffusing apparatus 10 than without. It was also found that the presence of the impact diffusing apparatus 10 did not result in helmet damage. The impact testing indicated that equipping helmets with impact diffusing apparatus 10 may reduce peak headform accelerations.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. An impact diffusing apparatus for diffusing force on an object being impacted, the apparatus comprising:
    a body intersected by a plane having a first side and a second side opposite the first side, the body comprising:
        a first collapsible structure on the first side of the plane and a second collapsible structure on the second side of the plane, each collapsible structure comprising an interior surface and an exterior surface, wherein the interior surfaces of the collapsible structures are shaped to define an interior cavity, the first and second collapsible structures being designed to collapse in a collapse event upon application of a force greater than a predetermined threshold, the collapse event being characterized by an acceleration profile of the object; and
        air passages communicating between the interior cavity of the collapsible surfaces and an external environment, the air passages having a sufficiently large flow area such that air flow during the collapse event has a negligible effect on the acceleration profile of the object; and
    a mounting structure for mounting the body to the object.

2. The impact diffusing apparatus of claim 1, wherein the collapsible structures are constructed from composite materials comprising at least one type of fiber and at least one resin.

3. The impact diffusing apparatus of claim 2, wherein the at least one type of fiber is carbon fiber, fiberglass, aramid, felt in a non-woven mulch form or combinations therefore, and the at least one resin is epoxy, polyester, polyurethane or combinations thereof.

4. The impact diffusing apparatus of claim 1, wherein each collapsible structure comprises a semi-hemispherical shape.

5. The impact diffusing apparatus of claim 4, wherein each collapsible structure is angled outward relative to the interior cavity at the plane.

6. The impact diffusing apparatus of claim 1, wherein each collapsible structure comprises a hemispherical shape.

7. The impact diffusing apparatus of claim 1, wherein the mounting structure comprises a rigid mounting plate attached to an apex of the first collapsible structure.

8. The impact diffusing apparatus of claim 1, wherein the mounting structure comprises a foam retainer attached to the object and defining a cavity that receives and retains the body.

9. The impact diffusing apparatus of claim 1, wherein the body further comprises a mesh layer that separates the first and second collapsible structures, the mesh layer forming the air passages.

10. The impact diffusing apparatus of claim 1, wherein at least one of the first and second collapsible structures are textured to induce collapsing at specific locations.

11. The impact diffusing apparatus of claim 1, further comprising an indicator for indicating the collapse of one or more of the first and second collapsible structures.

12. In combination:
    a helmet comprising a rigid exterior layer;
    an impact diffusing apparatus comprising:
        a body intersected by a plane having a first side and a second side opposite the first side, the body comprising:
            a first collapsible structure on a first side of the plane and a second collapsible structure on a second side of the plane, each collapsible structure comprising an interior surface and an exterior surface, wherein the interior surfaces of the collapsible structures are shaped to define an interior cavity, the first and second collapsible structures being designed to collapse in a collapse event upon application of a predetermined force; and
            air passages communicating between the interior cavity of the collapsible surfaces and an external environment, the air passages having a sufficiently large flow area such that air flow during the collapse event has a negligible effect on an acceleration profile of the object; and
        a mounting structure for mounting the body to the helmet.

13. The combination of claim 12, wherein the collapsible structures are constructed from composite materials comprising at least one type of fiber and at least one resin.

14. The combination of claim 12, wherein the at least one type of fiber is carbon fiber, fiberglass, aramid, felt in a non-woven mulch form or combinations thereof, and the at least one resin is epoxy, polyester, polyurethane or combinations thereof.

15. The combination of claim 12, wherein each collapsible structure comprises a semi-hemispherical shape.

16. The combination of claim 15, wherein each collapsible structure is angled outward relative to the interior cavity at the plane.

17. The combination of claim 12, wherein each collapsible structure comprises a hemispherical shape.

18. The combination of claim 12, wherein the mounting structure comprises a rigid mounting plate attached to an apex of the first collapsible structure.

19. The combination of claim 12, wherein the mounting structure comprises a foam retainer attached to the object and defining a cavity that receives and retains the body.

20. The combination of claim 12, wherein the body further comprises a mesh layer that separates the first and second collapsible structures, the mesh layer forming the air passages.

21. The combination of claim 12, wherein at least one of the first and second collapsible structures are textured to induce collapsing at specific locations.

22. The combination of claim 12, wherein the mounting structure are affixed to a back side of the helmet.

23. The combination of claim 12, wherein the helmet is a hockey helmet.

24. The combination of claim 12, wherein the impact diffusing apparatus further comprises an indicator for indicating the collapse of one or more of the first and second collapsible structures.

25. An impact diffusing apparatus for diffusing force on an object being impacted, the apparatus comprising:
- a first collapsible structure and a second collapsible structure, each collapsible structure having a closed end and an open end, the open end of the first collapsible structure being attached to the open end of the second collapsible structure to define an interior cavity, the first and second collapsible structures being designed to collapse in a collapse event upon application of a predetermined force;
- air passages communicating between the interior cavity of the collapsible surfaces and an external environment, the air passages having a sufficiently large flow area such that air flow during the collapse event has a negligible effect on an acceleration profile of the object; and
- a mounting structure for mounting the body to the object.

26. The impact diffusing apparatus of claim 25, wherein the collapsible structures are constructed from composite materials comprising at least one type of fiber and at least one resin.

27. The impact diffusing apparatus of claim 26, wherein the at least one type of fiber is carbon fiber, fiberglass, aramid, felt in a non-woven mulch form, and combinations thereof, and the at least one resin is epoxy, polyester, polyurethane, and combinations thereof.

28. The impact diffusing apparatus of claim 25, wherein each collapsible structure comprises a semi-hemispherical shape.

29. The impact diffusing apparatus of claim 28, wherein each collapsible structure is angled outward relative to the interior cavity at the plane.

30. The impact diffusing apparatus of claim 25, wherein each collapsible structure comprises a hemispherical shape.

31. The impact diffusing apparatus of claim 25, wherein the mounting structure comprises a rigid mounting plate attached to an apex of the first collapsible structure.

32. The impact diffusing apparatus of claim 25, wherein the mounting structure comprises a foam retainer attached to the object and defining a cavity that receives and retains the body.

33. The impact diffusing apparatus of claim 25, wherein the body further comprises a mesh layer that separates the first and second collapsible structures, the mesh layer forming the air passages.

34. The impact diffusing apparatus of claim 25, wherein at least one of the first and second collapsible structures are textured to induce collapsing at specific locations.

35. The impact diffusing apparatus of claim 25, further comprising an indicator for indicating the collapse of one or more of the first and second collapsible structures.

36. The impact diffusing apparatus of claim 1, wherein the first and second collapsible structures are designed to fracture upon application of a predetermined force.

37. The combination of claim 12, wherein the first and second collapsible structures are designed to fracture upon application of a predetermined force.

38. The impact diffusing apparatus of claim 25, wherein the wherein the first and second collapsible structures are designed to fracture upon application of a predetermined force.

* * * * *

UNITED STATES PATENT AND TRADEMARK OFFICE
CERTIFICATE OF CORRECTION

Page 1 of 1

PATENT NO. : 10,228,036 B2
APPLICATION NO. : 15/060284
DATED : March 12, 2019
INVENTOR(S) : Beyer It is certified that error appears in the above-identified patent and that said Letters Patent is hereby corrected as shown below:

In the Claims

| Column | Line | Error |
|---|---|---|
| 9 (Claim 22, Line 2) | 2 | "structure are" should read --structure is-- |
| 10 (Claim 38, Lines 1-2) | 31-32 | "wherein the wherein the" should read --wherein the-- |

Signed and Sealed this
Eighteenth Day of June, 2019

Andrei Iancu
*Director of the United States Patent and Trademark Office*